(12) United States Patent
Hayakawa et al.

(10) Patent No.: US 7,083,439 B1
(45) Date of Patent: Aug. 1, 2006

(54) MOBILE TERMINAL APPARATUS

(75) Inventors: Nariyasu Hayakawa, Kawasaki (JP); Taketsugu Kawamichi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/320,730

(22) Filed: Dec. 30, 2005

(30) Foreign Application Priority Data

Sep. 27, 2005 (JP) .............................. 2005-280089

(51) Int. Cl.
*H01R 13/44* (2006.01)
(52) U.S. Cl. ..................................... 439/136
(58) Field of Classification Search ............. 439/136, 439/519, 521
See application file for complete search history.

(56) References Cited

U.S. PATENT DOCUMENTS

| | | | |
|---|---|---|---|
| 6,309,246 B1 * | 10/2001 | Keaton et al. | 439/521 |
| 6,619,983 B1 * | 9/2003 | Ota et al. | 439/521 |
| 6,840,796 B1 * | 1/2005 | Marcinkiewicz et al. | 455/558 |
| 2003/0013333 A1 * | 1/2003 | Nagata | 439/141 |
| 2005/0037820 A1 | 2/2005 | Yamazaki | |

FOREIGN PATENT DOCUMENTS

| | | |
|---|---|---|
| JP | 2002-009911 | 1/2002 |
| JP | 2005-044547 | 2/2005 |

\* cited by examiner

*Primary Examiner*—Briggitte R. Hammond
(74) *Attorney, Agent, or Firm*—Staas & Halsey LLP (57) ABSTRACT

A mobile terminal apparatus includes a housing including an opening and a claw engaging rib, a cap including a cap attachment that is made of a flexible material, and includes a claw portion and a cap body, and a bypass engaging structure with which the claw bypasses the claw engaging rib and engages with the claw engaging rib from one side of the claw engaging rib, when attaching the cap.

8 Claims, 6 Drawing Sheets

MOBILE TERMINAL APPARATUS

BACKGROUND OF THE INVENTION

1. Field of the Invention

The present invention generally relates to a mobile terminal apparatus such as a mobile telephone equipped with a cap formed at a part of a housing for an opening for a connector, earphone jack, memory card slot, etc., and more particularly, to a mobile terminal apparatus with a balance between an insertion force for easy attachment of a removable cap into the housing and a withdrawal resistance for preventing the cap from easily slipping off.

2. Description of the Related Art

In recent years, various types of mobile terminals are on the market, such as a small-size information processing terminal including a mobile telephone and a personal digital assistant (PDA), a small-size music player, and a portable television. The mobile terminals are equipped with a connector for connecting an external device for data communication, power supply, etc., as well as an earphone jack, memory card, etc., depending on the applications. The connector is disposed in an opening formed at a part of a housing and exposed to outside. To hide the connector and other connecting means not in use for protecting them from water and dust and for the aesthetic point, a cap is attached to the housing for the opening in such a manner that the cap can be removed when the connector and other connecting means are used (see, for example, Japanese Patent Application-Laid-Open No. 2005-44547).

Figure 5:
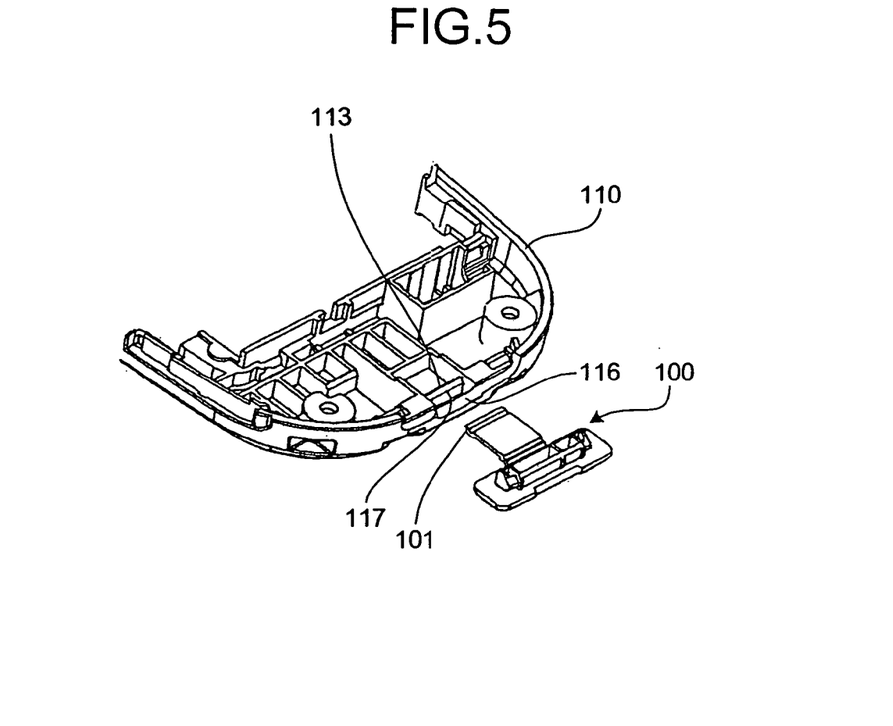
FIG. 5 is a perspective view of a conventional claw structure before being attached.
Figure 6:
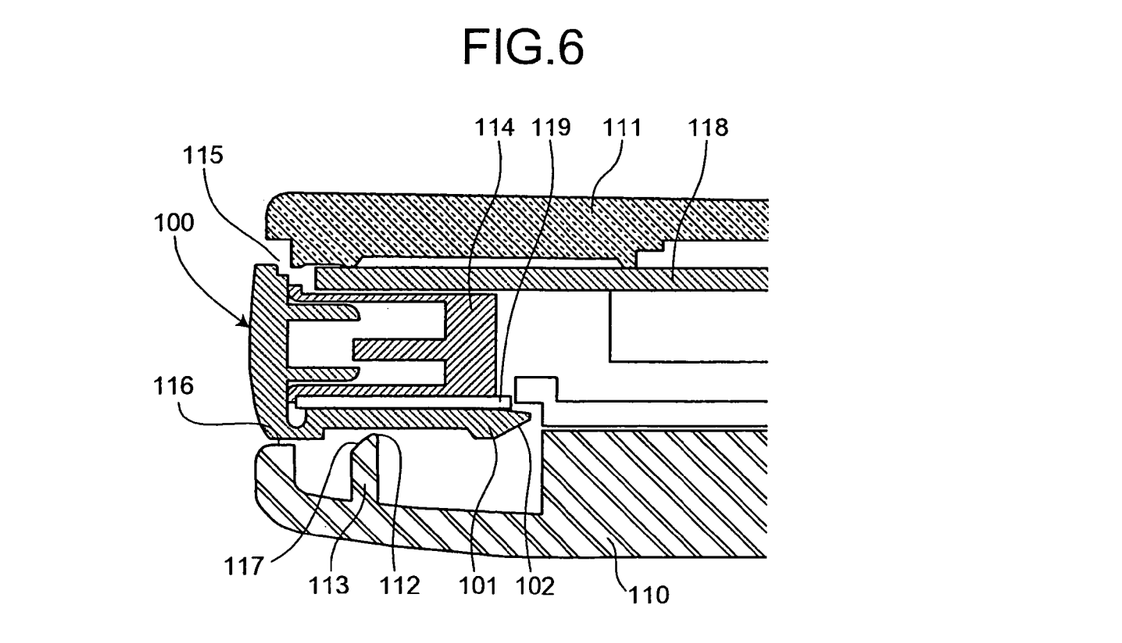
FIG. 6 is a partial cross-section of an example of the conventional claw structure after being attached.

A first type of cap uses a claw structure. FIG. 5 is a perspective view of a conventional claw structure before being attached, and FIG. 6 is a partial cross-section of the conventional claw structure after being attached. The claw structure includes a claw 101 and a claw engaging rib 113. The claw 101 is made of a flexible material and formed as a part of a cap 100, while the claw engaging rib 113 is provided in a housing 110 of a two-split structure made of housings 110 and 111. The housing 110 includes an engaging gap 112 that is narrower than the claw 101 to prevent the claw 101 from slipping off from the claw engaging rib 113 once the cap 100 is attached. For attaching the cap 100, the claw 101 is inserted through a recess 116 formed at a part of the housing 111 into an opening 115 that is formed between the housings 110 and 111 for accommodating a connector 114 installed in the housing 111, toward the claw engaging rib 113. In the engaging gap 112, projections of the cap 100 and/or the housing 110 are resiliently deformed to force the claw 101 to engage the claw engaging rib 113. For facilitating the insertion operation during attachment, inclined planes 102 and/or 117 are provided in the claw 101 and/or the claw engaging rib 113.

Figure 7:
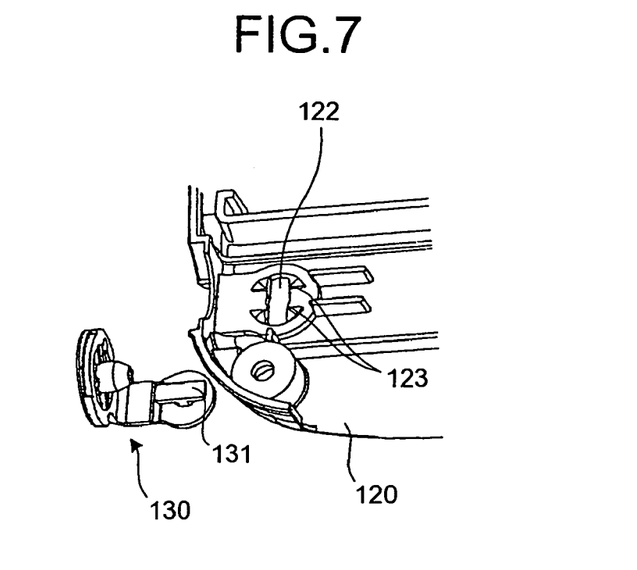
FIG. 7 is a perspective view of a conventional rotary structure before being attached.
Figure 8:
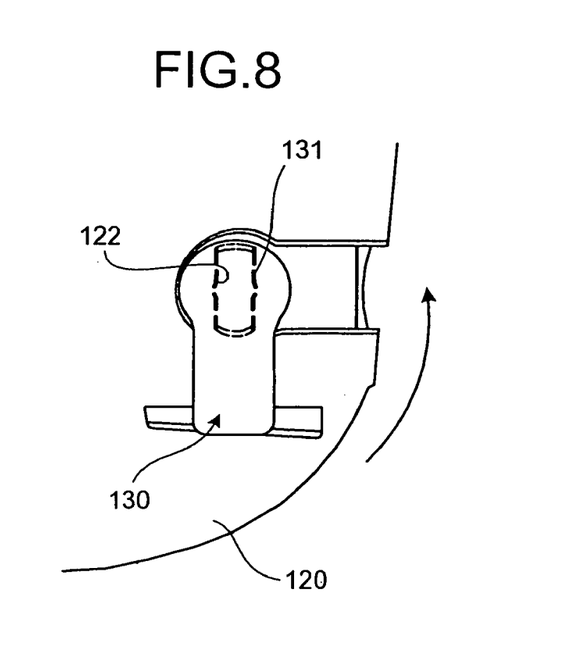
FIG. 8 is a bottom view of the conventional rotary structure during attachment.
Figure 9:
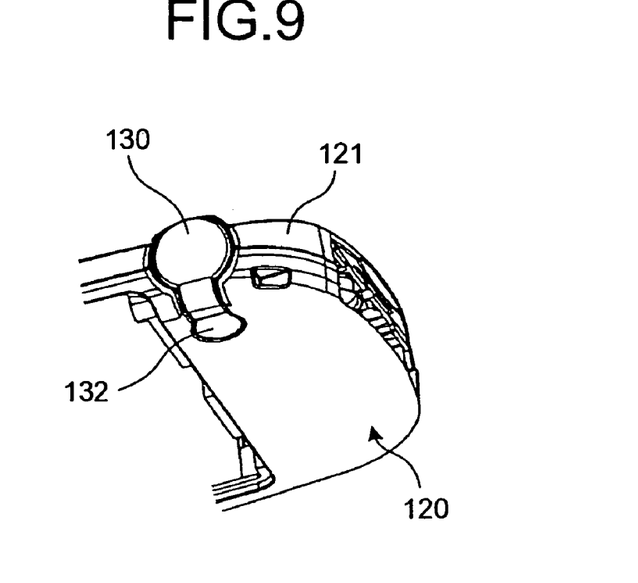
FIG. 9 is a perspective view of the conventional rotary structure after being attached.

A second type of cap uses a rotary attachment structure. FIG. 7 is a perspective view of a conventional rotary structure before being attached; FIG. 8 is a bottom view of a cap during attachment; and FIG. 9 is a perspective view of the attached cap. The rotary attachment structure includes a slit 122 in a housing 120 of a two-split structure composed of housings 120 and 121, formed in a direction orthogonal to the opening/closing direction of a cap 130, and a fixing protrusion 131 formed at the cap 130, with a shape and dimensions adapted to the slit 122, in the same direction as the extracting direction. As shown in FIG. 8, the cap 130 is first placed at an angle orthogonal to the attachment direction to the engage the fixing protrusion 131 in the slit 122, and then rotated in the direction indicated by the arrow until it is positioned in place and finally attached as shown in FIG. 9. In some cases, protrusions 123 are provided inside the housing 120 around the slit 122, which engage the fixing protrusion 131 of the cap 130 to prevent the cap 130 from rotating in the disengaging direction. Another similar structure has a slit formed at the cap, and a fixing protrusion formed in the housing. An attachment structure similar to the second type is disclosed in Japanese Patent Application-Laid-Open No. 2002-9911.

Figure 10:
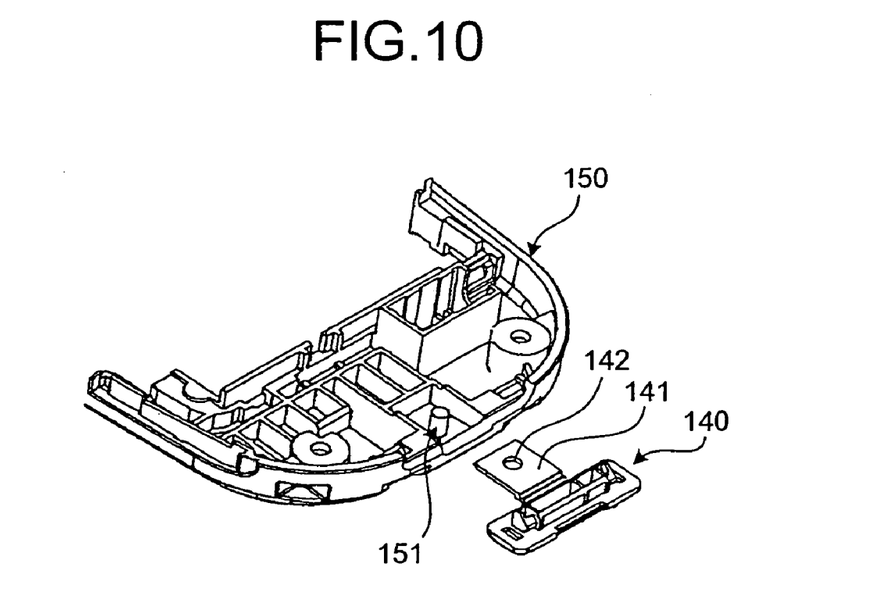
FIG. 10 is a perspective view of a conventional pin fixing structure before being attached.

A third type of cap uses a fixing structure using a pin or the like. FIG. 10 is a perspective view of a conventional pin fixing structure before being attached. The pin fixing structure includes a hole 142 formed in an attachment part 141 of a cap 140, and a fixing pin 151 formed inside a housing 150 of a two-split structure. The cap 140 is attached and fixed to the housing 150 by engaging the fixing pin 151 in the hole 142 of the cap 140 before the apparatus is completely assembled.

According to the convention technology, efforts have been made by selectively using a suitable structure among the first to third types described above, based on a priority of requirements including the structure of a housing, easiness of design, cost, and repairability. However, none of the above structures has satisfied all of the requirements such as a smaller and thinner cap attachment portion, which is essential for a smaller and thinner apparatus, a high withdrawal resistance preventing the cap from easily slipping off during cap opening/closing operation, a low insertion force for easy assembly, complete or substantially complete insusceptibility to variations in part and assembly precisions, excellent maintainability requiring no special tools or disassembly of the apparatus, and prevention of damages that may be caused by an abnormally strong extraction force.

In the first type, for example, the withdrawal resistance depends on the engaging amount of the claw 101 to the claw engaging rib 113. To increase the withdrawal resistance, the engaging amount should be increased or the material of the claw 101 hardened. If the engaging amount is increased or the material of the claw 101 is hardened, however, more insertion force is required, which adversely affects the easiness of assembly and repairability, because projections of the cap 100 and/or the housing 110 must be resiliently deformed for forcing the claw 101 to pass over the claw engaging rib 113 through the engaging gap 112 that is narrower than the claw 101. On the other hand, if the engaging amount or material hardness of the claw 101 is decreased for reducing the insertion force, the withdrawal resistance is reduced, which may cause the cap 100 to slip off and be lost. In the first type, the withdrawal resistance and the insertion force are so closely related with each other as described above, it is difficult to achieve both a high withdrawal resistance and a low insertion force.

In particular, in a structure in which the engaging gap 112 is formed between the upper end of the claw engaging rib 113 and a plurality of component members facing this upper end, including a circuit board 118, the connector 114, and a sheet member 119 as shown in FIG. 6, the engaging gap 112 is easily affected by variations of individual component and assembly precisions. Accordingly, it is difficult to keep a precise engaging amount of the claw 101 of the cap 100 to the claw engaging rib 113 of the housing 110 to secure a stable withdrawal resistance and insertion force. A strict control of dimensional tolerances of components and assembly variations during design and manufacturing stages will incur not only additional control cost and thus increased total cost, but also additional development steps of a mobile terminal equipped with such a cap, for regulating and controlling the balance between the withdrawal resistance and the insertion force and repeatedly adjusting the dimensions and shapes using prototypes or actual models.

On the other hand, the second type can easily secure a high withdrawal resistance and a low insertion force, since the withdrawal resistance and the insertion force are not related to each other. An attachment 132 of the cap 130, however, limits the degree of freedom in design, since it is visibly disposed on the outer surface of the housing 120 as shown in FIG. 9 for example. Its rotary attachment structure also limits the shape of the externally visible part of the attachment 132 and thus the degree of freedom in designing the shape of the attachment 132. Furthermore, a total thickness of the area where the attachment 132 is disposed must accommodate the thickness of the cap 130, that of the housing 120, and that of the fixing portion of the cap 130, which makes difficult a smaller and thinner design. It also requires two different operations of insertion and rotation for attachment, resulting in increased attachment steps.

The third type provides secure attachment of the cap 140 to the housing 150, as well as a high withdrawal resistance, since the hole 142 formed in the attachment part 141 of the cap 140 fits into the fixing pin 151 in the housing 150. The easiness of assembly and maintainability is reduced, however, because the hole 142 must be fitted onto the fixing pin 151 before the two-split housing is assembled. If an abnormally strong extraction force is applied to the cap 140, the hole 142 does not disengage from the fixing pin 151 and the attachment part 141 of the cap 140 and/or the fixing pin 151 of the housing 150 may be damaged.

SUMMARY OF THE INVENTION

It is an object of the present invention to at least solve the problems in the conventional technology.

A mobile terminal apparatus according to one aspect of the present invention includes a housing including an opening and a claw engaging rib formed inside the opening at a location interfering with a cap insertion; a cap including a cap attachment that is made of a flexible material, and includes a claw portion that is engaged with the claw engaging rib for preventing the cap from slipping off in a cap extraction direction and a connection portion that includes the claw portion at a leading edge in an integral manner, and is formed with a thickness slender enough to enter an engaging gap narrower than a thickness of the claw, and a cap body that that is formed at a trailing edge of the connection portion in an integral manner, and closes the opening in an openable manner; and a bypass engaging structure with which the claw bypasses the claw engaging rib and engages with the claw engaging rib from one side of the claw engaging rib, when attaching the cap.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Figure 1:
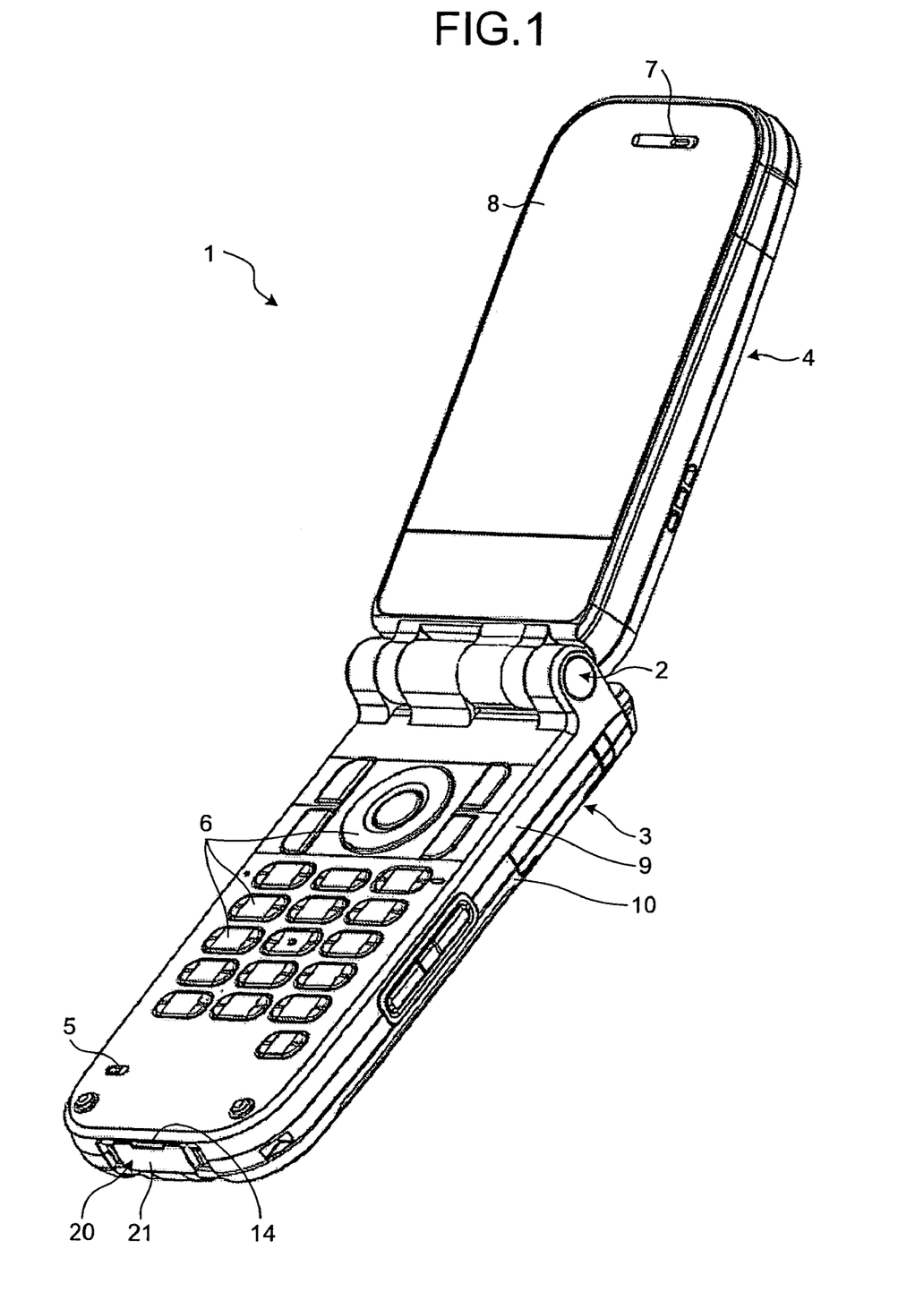
FIG. 1 is a perspective view of an external appearance of a mobile telephone according to an embodiment of the present invention.

Exemplary embodiments of the present invention will now be explained in detail below with reference to the accompanying drawings. It should be noted that the present invention is not limited to the exemplary embodiments. The embodiments show an example of applying the present invention to a mobile telephone as the mobile terminal. FIG. 1 is a perspective view of an external appearance of a mobile telephone 1 according to an embodiment of the present invention. The mobile telephone 1 includes a transmitter-side housing 3 and a receiver-side housing 4, which are connected to a hinge 2 and can be folded. The transmitter-side housing 3 includes a transmitter 5 with a built-in microphone, and various operation keys 6 such as dialing keys and function keys. The receiver-side housing 4 includes a receiver 7 with a built-in loudspeaker etc. and a liquid crystal display 8.

Figure 2:
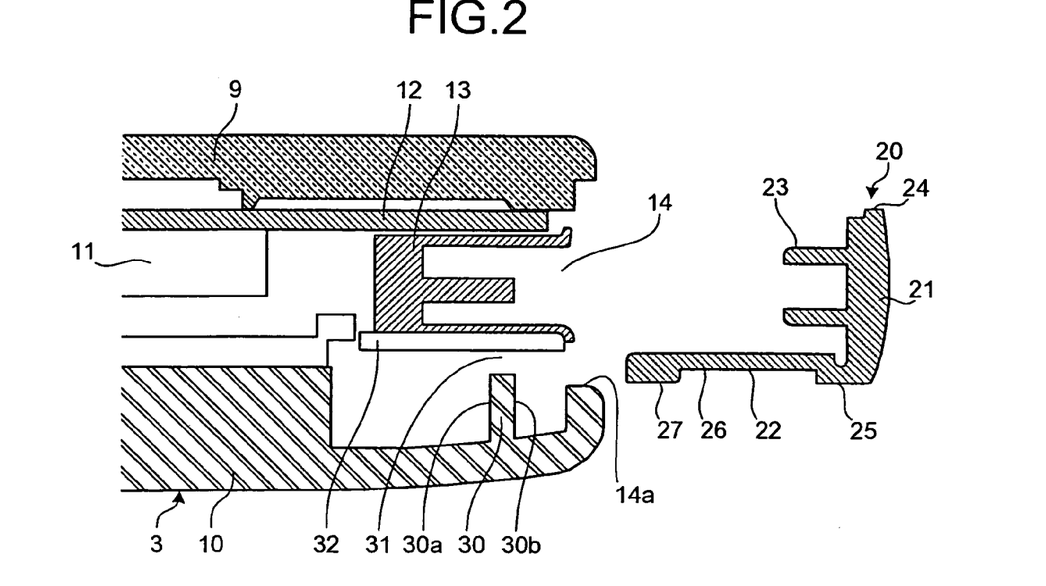
FIG. 2 is a vertical cross-section of an example of an internal structure of one end of a transmitter-side housing.
Figure 3:
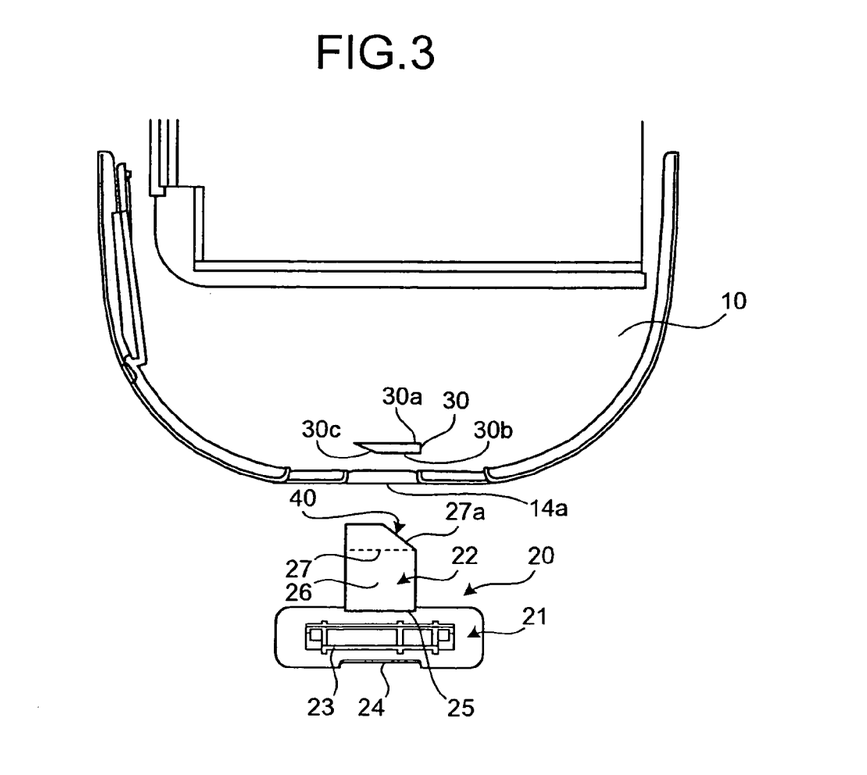
FIG. 3 is a schematic for illustrating a cap before being attached.

FIG. 2 is a vertically cross-section of an example of an internal structure of the transmitter-side housing 3, and FIG. 3 is a schematic for illustrating a cap before being attached. As shown in FIG. 2, the transmitter-side housing 3, which is rectangular and flat palmtop size, includes a two-split structure including a front housing 9 that forms an inner face with the operation keys 6 etc. thereon and a rear housing 10 that forms an outer face. The front housing 9 houses a circuit board 12 with various circuit components 11 thereon. The circuit board 12 includes a connector 13 mounted at the center of one end of the front housing 9. The connector 13 connects a plug (not shown) for the transmitting data. The transmitter-side housing 3 includes an opening 14 formed by recesses provided in housings 9 and 10, which exposes the connector 13 to outside for receiving the plug.

According to the present embodiment, the mobile telephone 1 is equipped with a cap 20 for openably closing the opening 14, and a claw engaging rib 30 that is formed inside the rear housing 10 for preventing the cap 20 from slipping off. The cap 20 is made of an easily deformable, flexible resin material such as elastomer and has a cap body 21 and a cap attachment 22 that are integrally formed. The cap body 21 is a rectangular, flat piece with a shape and size adapted to the opening 14 to openably close the opening 14 and includes a rib 23 that lightly fits the connector 13 etc. to keep the opening 14 closed, and a slightly recessed cavity 24 for facilitating opening/closing operation. The cap body 21 is connected to the cap attachment 22 by means of a foldable thin-walled hinge 25. The hinge 25 may have a basic form folded at generally 90 degrees as shown in FIG. 2, or unfolded as shown in FIG. 3. The cap attachment 22 is narrower in width than the cap body 21 and protrudes from the hinge 25 at the bottom center of the cap body 21. The cap attachment 22 includes a connection part 26 integrally formed with a claw 27 protruding downward from its end.

The claw engaging rib 30 is integrally formed with the rear housing 10 at its widthwise center, behind the opening 14, in an area interfering with the cap insertion and extraction direction. The claw engaging rib 30 includes a width generally identical to that of the claw 27, with an engaging plane 30a on its rear face for preventing the claw 27 from slipping off. The distance between the claw 27 and the hinge 25 is longer than that between the opening 14 and the engaging plane 30a of the claw engaging rib 30. The rear housing 10 includes a recess 14a formed in the opening 14 at its widthwise center, facing the claw engaging rib 30, for guiding the insertion of the cap attachment 22. The rear housing 10 further includes an engaging gap 31 between the upper end of the claw engaging rib 30 and the connector 13 facing the upper end of the claw engaging rib 30. The connector 13 is provided with a gap adjustment member 32 that is a separate flat member for adjusting the engaging gap 31. The engaging gap 31 is narrower than the claw 27 so that only the connection part 26 can slide into it.

According to the present embodiment, the mobile telephone 1 includes a bypass engaging structure 40 for attaching the cap 20 to the transmitter-side housing 3, which forces the claw 27 to bypass the claw engaging rib 30 and engage the engaging plane 30a from one side. The bypass engaging structure 40 resiliently deforms and moves the cap attachment 22 sideward, not in the insertion and engaging direction caused by the insertion operation of the cap attachment 22, to force the claw 27 to bypass the claw engaging rib 30 and engage with it from one side.

According to the present embodiment, the bypass engaging structure 40 makes use of the flexibility of the cap attachment 22 for resilient deformation and movement while being inserted, as well as a plane inclined at a given angle for forcing the cap attachment 22 to resiliently deform and move sideward. The inclined plane is inclined in a lateral direction with respect to the insertion direction (i.e., in the direction orthogonal to the insertion and engaging direction) and formed in an area where the leading edge of the claw 27 interferes with a bumping face 30b of the claw engaging rib 30.

According to the present embodiment, an inclined plane 27a is formed on the leading edge of the claw 27, and an inclined plane 30c is formed on the bumping face 30b of the claw engaging rib 30. As shown in FIG. 3, the inclined planes 27a and 30c are inclined in the same direction and formed on different sides in the horizontal direction (in the direction of rib width) such that the ends of the inclined planes 27a and 30c meet on the straight line crossing the widthwise center of the claw 27. The inclined planes 27a and 30c may also be formed such that their boundaries overlap each other in the widthwise direction. Alternatively, a single inclined plane may be formed on either the claw 27 or the claw engaging rib 30.

Figure 4A:
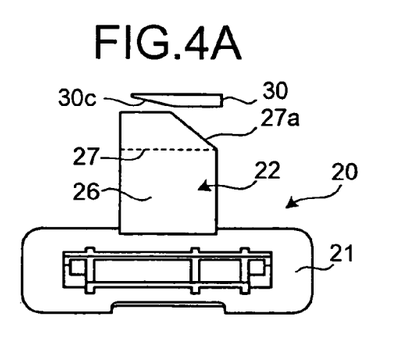
FIGS. 4A to 4D are schematics for illustrating a sequence of actions of the bypass engaging structure during cap attachment operation.

FIGS. 4A to 4D are schematics for illustrating a sequence of actions of the bypass engaging structure 40 during the cap attachment operation. The cap attachment 22 is inserted into the opening 14, guided by the recess 14a and the gap adjustment member 32, toward the claw engaging rib 30, as shown in FIG. 4A. Caused by this insertion operation, the leading edge of the claw 27 bumps the bumping face 30b of the claw engaging rib 30, which is formed in an area interfering with the claw 27 being inserted, but the claw 27 does not enter the engaging gap 31 because the claw 27 is sufficiently thicker than the height of the engaging gap 31.

Figure 4B:
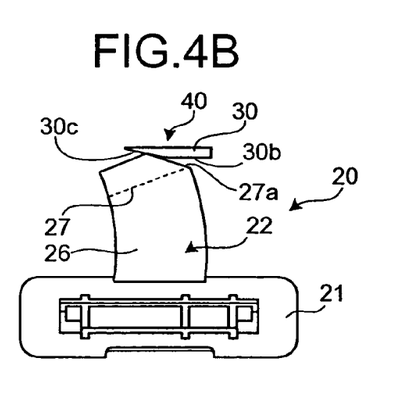

When further inserted, the cap attachment 22 made of a flexible material deforms itself, and the inclined planes 27a and 30c bump each other and resiliently deform and move the cap attachment 22 to one side of the claw engaging rib 30, to the left in this example. FIG. 4B shows the inclined planes 27a and 30c bumping each other and resiliently deforming and moving the cap attachment 22 to left. According to the present embodiment, the boundaries of the inclined planes 27a and 30c are continuous (or overlapped) in the widthwise direction, so that the cap attachment 22 can stably and smoothly deform itself and move to left after the leading edge of the claw 27 bumps the bumping face 30b of the claw engaging rib 30 and the inclined planes 27a and 30c bump each other.

Figure 4C:
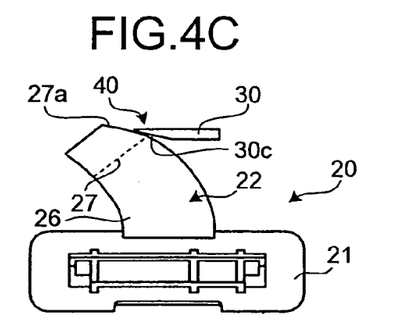
Figure 4D:
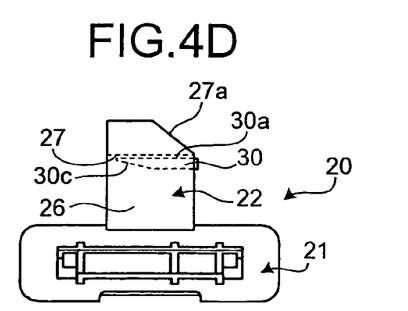

When inserted further inward, the cap attachment 22 further deforms itself and moves to the left of the claw engaging rib 30, as shown in FIG. 4C until the inclined planes 27a and 30c lose contact with each other. Once the inclined planes 27a and 30c have lost contact with each other, the resilience of the cap attachment 22 forces the claw 27 to engage with the engaging plane 30a from the left of the claw engaging rib 30 as shown in FIG. 4D. At the same time, the connection part 26 of the cap attachment 22 slides into the engaging gap 31 from the left and the cap attachment 22 restores its original shape. Thus, the claw 27 engages the claw engaging rib 30, with the cap attachment 22 unheaved. After the connection part 26 enters the engaging gap 31, the cap attachment 22 is further inserted until the opening 14 is covered and closed by the cap body 21. Thus, the cap 20 is completely attached to the transmitter-side housing 3.

To insert a plug into the connector 13, the user of the mobile telephone 1 can expose the opening 14 by removing the cap body 21 with a finger applied to the cavity 24. For easier insertion of the plug into the connector 13, the user may further draw out the cap attachment 22 until the claw 27 stops at the engaging plane 30a of the claw engaging rib 30.

As described above, according to the present embodiment, the bypass engaging structure 40 is used to attach the cap 20 to the transmitter-side housing 3, which forces the claw 27 to bypass the claw engaging rib 30 and engage with the engaging plane 30a of the claw engaging rib 30 from one side, instead of forcing the claw 27 to pass over the claw engaging rib 30 through the engaging gap 31 and engage with the claw engaging rib 30 from the front. Since the claw 27 does not pass through the engaging gap 31, the engaging amount of the claw 27 can be designed, without the height of the engaging gap 31 being considered, to secure a high withdrawal resistance enough to prevent the claw 27 from slipping off the engaging plane 30a of the claw engaging rib 30 during normal cap opening operation. The engaging gap 31 can also be designed, without the engaging amount of the claw 27 being considered, to achieve a low insertion force that allows only the connection part 26 to enter. Thus, both the high withdrawal resistance and the low insertion force can be achieved. Since the claw 27 is based on the claw structure shown in the first conventional type, the attachment of the cap 20 is not directly visible from outside and therefore does not limit the degree of freedom in designing the mobile telephone 1. If the cap 20 is extracted with an abnormally strong force, its own flexibility allows the claw 27 engaged with the engaging plane 30a of the claw engaging rib 30 to resiliently deform itself to pass over the claw engaging rib 30 through the engaging gap 31 and get out of the transmitter-side housing 3 without damaging the cap 20, the claw engaging rib 30, and peripheral structures. Further, the cap 20 can be attached with neither disassembling the apparatus (the housings 9 and 10) nor using special tools.

According to the present embodiment, the bypass engaging structure 40 for forcing the claw 27 to bypass the claw engaging rib 30 and engage with the engaging plane 30a from one side can be easily implemented making use of resilient deformation and movement of the cap attachment 22 made of a flexible material, caused by insertion operation. Further, in the bypass engaging structure 40 that includes laterally the inclined planes 27a and 30c formed in the claw 27 and the claw engaging rib 30, in areas where the claw 27 being inserted interferes with the claw engaging rib 30, normal insertion of the cap attachment 22 toward the claw engaging rib 30 and the resulting interference between the inclined planes 27a and 30c guide resilient deformation and movement of the cap attachment 22, causing the claw 27 to bypass the claw engaging rib 30 and engage with the engaging plane 30a from one side. Thus, the easiness of attachment is enhanced without additional attachment steps. In particular, the inclined planes 27a and 30c formed in both the claw 27 and the claw engaging rib 30 stably and forcibly guide the resilient deformation and movement of the cap attachment 22 during insertion operation.

The present embodiment has been described as an example of applying the present invention to the cap 20 for closing the opening 14 accommodating the connector 13 of the mobile telephone 1; however, the present invention is not limited to the present embodiment. The present invention is also applicable to small-size information processing terminals such as a PDA, a small-size music player, a portable television, and other mobile terminals of various types, as well as to a cap for an earphone jack, and a memory card slot.

The present invention provides a bypass engaging structure for attaching a cap to a housing, which forces a claw to move sideward and engage with a claw engaging rib from one side, eliminating the need of forcing the claw to pass over a claw engaging rib through an engaging gap to engage in the claw engaging rib from the front. Since the claw does not pass through the engaging gap, the engaging amount of the claw required for a high withdrawal resistance preventing the claw from slipping off the claw engaging rib during normal cap opening/closing operations can be designed independently of the engaging gap that must allow in only the connection part with a low insertion force. Thus, both a high withdrawal resistance and a low insertion force can be achieved. Since the bypass engaging structure is based on a claw structure, the attachment of the cap is invisible from outside and does not limit the degree of freedom in housing design. If the cap is extracted with an abnormally strong force, the claw engaged with the claw engaging rib resiliently deforms itself to pass over the claw engaging rib through the engaging gap and gets out of the housing without damaging the cap and housing.

According to the present invention, a bypass engaging structure can be easily implemented making use of resilient deformation of the cap attachment made of a flexible material to force the claw to move sideward and engage in the claw engaging rib from one side while the cap is being inserted.

Furthermore, according to the present invention, the bypass engaging structure has a claw with a leading edge having a plane inclined in a lateral direction with respect to the insertion direction, over the area interfering with the claw engaging rib in the insertion direction. When the cap attachment is inserted toward the claw engaging rib as usually practiced, interference occurs between this inclined plane and the claw engaging rib and resiliently deforms the cap attachment and forces the claw to move sideward and engage with the claw engaging rib from one side. This structure enhances the easiness of attachment with no additional attachment steps.

Moreover, according to the present invention, inclined planes are formed on both the claw engaging rib and the claw, which stably guide the resilient deformation of the cap attachment and thus movement of the claw while the cap attachment is being inserted.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. A mobile terminal apparatus comprising:
   a housing including an opening and a claw engaging rib formed inside the opening at a location interfering with a cap insertion;
   a cap including
      a cap attachment made of a flexible material, the cap attachment including a claw portion that is engaged with the claw engaging rib for preventing the cap from slipping off in a cap extraction direction and a connection portion that includes the claw portion at a leading edge in an integral manner, and is formed with a thickness slender enough to enter an engaging gap narrower than a thickness of the claw; and
      a cap body that that is formed at a trailing edge of the connection portion in an integral manner, and closes the opening in an openable manner; and
   a bypass engaging structure with which the claw bypasses the claw engaging rib and engages with the claw engaging rib from one side of the claw engaging rib, when attaching the cap.

2. The mobile terminal according to claim 1, wherein the engaging gap is formed between an upper edge of the claw engaging rib and other member fixed to the housing in opposite to the upper edge of the claw engaging rib.

3. The mobile terminal according to claim 1, wherein the bypass engaging structure resiliently deforms and moves the cap attachment to a lateral direction different from an insertion direction of the cap attachment and guides the cap attachment to the one side of the claw engaging rib.

4. The mobile terminal according to claim 3, wherein the bypass engaging structure includes an inclined plane that is formed at an area where the claw interferes with the claw engaging rib in the insertion direction, in an inclined manner in a lateral direction with respect to the insertion direction.

5. The mobile terminal according to claim 4, wherein the inclined plane is formed at either one of the claw engaging rib and the claw.

6. The mobile terminal according to claim 4, wherein the inclined plane is formed at both of the claw engaging rib and the claw.

7. The mobile terminal according to claim 6, wherein the inclined plane formed at both the claw engaging rib and the claw includes a boundary formed in either one of a continuous manner and an overlapped manner in a direction of a rib width.

8. The mobile terminal according to claim 6, wherein the inclined plane formed at both the claw engaging rib and the claw is formed in such a manner that a half of the inclined plane is formed in such a manner that the inclined plane shares different sides in a direction of a rib width, being inclined in a same direction.

* * * * *

UNITED STATES PATENT AND TRADEMARK OFFICE
CERTIFICATE OF CORRECTION

| | | |
|---|---|---|
| PATENT NO. | : 7,083,439 B1 | Page 1 of 1 |
| APPLICATION NO. | : 11/320730 | |
| DATED | : August 1, 2006 | |
| INVENTOR(S) | : Nariyasu Hayakawa | |

It is certified that error appears in the above-identified patent and that said Letters Patent is hereby corrected as shown below:

Column 8, Line 26, delete "that" before "is".

Signed and Sealed this

Thirtieth Day of January, 2007

JON W. DUDAS
*Director of the United States Patent and Trademark Office*